Sept. 29, 1953   H. H. PRECIOUS   2,653,332
FISHERMAN'S PLIER TYPE SHOT SPLITTING TOOL
Filed Aug. 24, 1951

INVENTOR
HARRY H. PRECIOUS,

BY
McMorrow, Berman & Davidson
ATTORNEYS

Patented Sept. 29, 1953

2,653,332

UNITED STATES PATENT OFFICE 2,653,332

FISHERMAN'S PLIER TYPE SHOT SPLITTING TOOL

Harry H. Precious, Wisconsin Rapids, Wis.

Application August 24, 1951, Serial No. 243,549

1 Claim. (Cl. 7—5.1)

This invention relates to a tool for use by fishermen, and more particularly, has reference to a tool of the pliers type, that is specifically adapted for attaching split shot to a fishing line or leader, or removing said shot from the line or leader, the tool being also adapted for cutting the line and for related purposes.

Split shot is used by many fishermen for the purpose of weighting their lines, said shot being generally formed in pellet shape, each pellet having a slot adapted to receive a fishing line or leader to which the pellet is to be clamped.

Heretofore, to my knowledge there has not been suggested a tool specifically adapted to open or close split shot, and up to the present time, it has been the custom among fishermen to open the shot, or clamp the shot to the line, with their teeth, or with conventional pliers. When a conventional pair of pliers is used, the pliers are adapted to close the shot upon the line, but are not adapted for removing the shot, and it has been customary to use a knife or the like to cut the line, so that the split shot may be pulled off the cut end. Obviously, this results in an undesirable loss of time, and also requires retieing a hook or fly to the line before fishing can be resumed. Customarily, a knife or a pair or fingernail clippers are used to trim undesirable ends from the re-tied line or leader.

It is the main object of the present invention to provide a tool which eliminates these several operations and tools that have heretofore been required, the tool comprising the present invention being specifically adapted to clamp the pellet to the line or leader, open the pellet for removal without requirement of cutting the line, and reclamp the pellet to the line whenever and wherever desired.

It is a further important object of the invention to embody in the construction of a tool of this type a line cutter which will be usable both for cutting the line, and for trimming loose ends from said line.

Still another important object is to form the tool referred to above in such a manner as to permit its operation for attaching or removing either small or large pellets.

Yet another object is to provide a tool as stated that will be rugged, simple in design, and capable of manufacture at relatively low cost.

Other objects will appear from the following description, the claim appended thereto, and from the annexed drawing, in which like reference characters designate like parts throughout the several views, and wherein:

Figure 1:
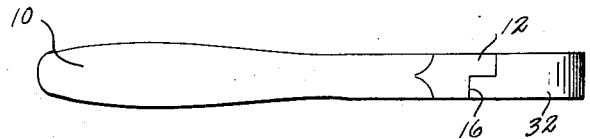
Figure 1 is a top plan view of a tool formed in accordance with the present invention.

Referring to the drawings in detail, the reference numeral 10 designates an elongated, longitudinally curved handle integrally formed at one end with a generally circular head 12 formed to a width which is half that of the handle, the head having a large opening 14 extending transversely of the tool. The formation of the head to a width half that of the handle defines at the upper end of the head a shoulder 16.

Immediately rearward of the head 12, the handle 10 is formed with a half round recess 18, for a purpose to be made presently apparent.

Integral with and projecting forwardly from the head 12 is a jaw 20 having a wholly flat working face 22.

A handle 24 is identical, though opposite to, the handle 10, and is formed at one end with a head 26 which is half the width of the handle 24, the heads 12 and 26 being arranged in side by side relation. The head 26 is formed with an opening 28 registering with the opening 14 of the head 12, and extending through the registering openings is a pivot pin 30. Immediately rearward of the head 26, the handle 24 is formed with a half round recess 31 cooperating with the recess 18 of the handle 10 to define a space adapted to receive a small pellet or split shot, thus to permit said pellet to be clamped to a fishing line or leader when the handles 10 and 24 are swung toward one another.

Figure 2:
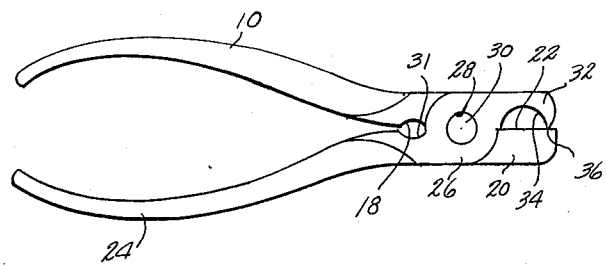
Figure 2 is a side elevational view.

Integral with the head 26, and extending forwardly therefrom, is a jaw 32 which is slightly shorter in length than the jaw 20. The working face of the jaw 32 is formed with a semi-circular recess 34, the outer end edge of which intersects with the end face of the jaw 32 to form a line cutting edge 36. As may be noted from Figure 2, when the jaws are in their closed positions, the edge 36 engages against the flat working face 22 at a location spaced inwardly from the outer end of said working face 22. Thus, a line can be positioned under the edge 36, upon the flat face 22, and on closing of the jaws said line will be cut swiftly and neatly.

A line or leader has been designated 38, and a pellet or split shot has been designated 40, said pellet being of conventional formation and being provided with the radial slot 42 adapted to receive the line 38, so that the pellet may be efficiently clamped to said line.

Figure 4:
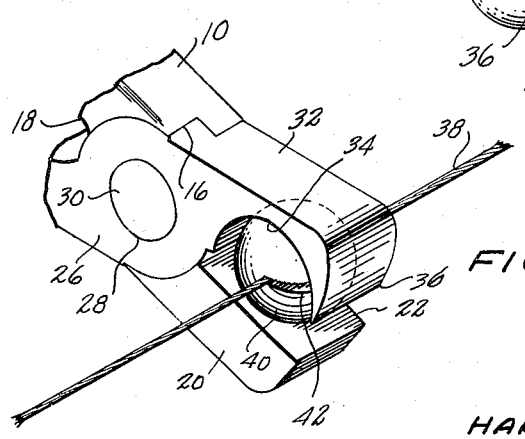
Figure 4 is a view similar to Figure 3, the tool being illustrated as it appears when being used to clamp a pellet to a line or leader.

The operation of clamping the pellet to the line is illustrated in Figure 4, and as may be noted, the recess 34 of the jaw 32 is adapted to receive the pellet, so as to hold the pellet against dropping accidentally out of the tool. The line or leader 38 is extended into the slot 42, after which the handles 10 and 24 are swung toward one another, thus to close the slot 42 and clamp the pellet securely to the fishing line.

Figure 3:
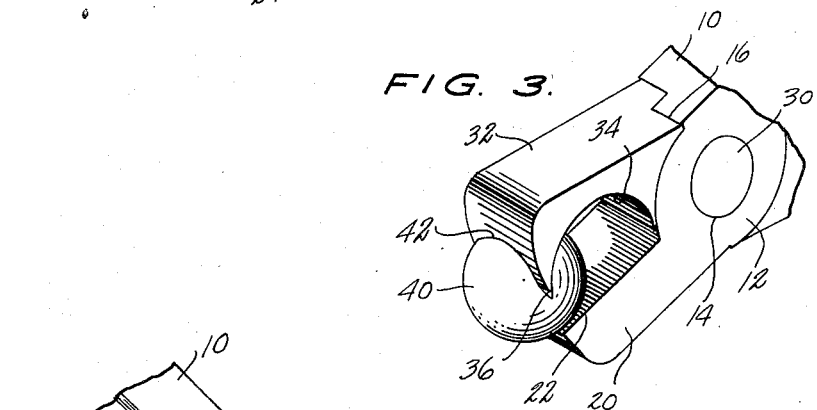
Figure 3 is an enlarged fragmentary perspective view showing the head end of the tool, the tool being illustrated as it appears when in use during the opening of a pellet.

At such times as it may be desired to remove the pellet from the fishing line, it is merely necessary to turn the pellet upwardly, so that its slot 42 is aligned with the cutting edge 36, in the manner shown in Figure 3. Thereafter, swinging of the handles 10 and 24 toward one another will be effective to spread the slot, so as to permit the fishing line to be removed from the pellet. The spreading of the slot occurs because the portion of the jaw 32 disposed immediately above the cutting edge 36 is of wedge shape. The wedge shape of the outer end of the jaw 32 obtains by reason of the converging relation of the outer end face of said jaw with the outer portion of the wall of the recess 34.

Considering the purpose of the stop shoulder 16, this limits opening movement of the jaws, said shoulder engaging the head 26 under these circumstances. It will be understood that the head 26 is also formed with a stop shoulder, at the opposite side of the tool, said shoulders binding substantially simultaneously against the heads contiguous thereto.

It is to be noted that by providing the knife with a continuous curve from the base to the cutting edge thereof, such curve will impart a corresponding curvature to the split formed in the shot. This curving of the split will have a desirable effect when the shot is subsequently clamped in a manner to close the split. When the split is closed it will provide a curved line rather than a straight radial line extending from the center of the shot to the outer surface thereof. The use of a curved line will eliminate or measurably reduce the possibility of the line accidentally being pulled out of the split in instances in which the split is not clamped about the line with sufficient tightness.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

In a shot-splitting fisherman's tool of the pliers type, a pair of pivotally connected handles; and first and second jaws rigid with the respective handles, the second jaw having a shot-supporting face, the first jaw being shorter in length than the second jaw for projection of the outer end of the second jaw beyond the outer end of the first jaw, the first jaw having at its outer end a splitting knife extending toward the second jaw, said knife tapering in the direction of the second jaw to terminate in a knife edge adjacent said face of the second jaw, the opposite, converging surfaces of said tapered knife being each formed with a continuous curve extending fully for the length of the knife from the base to said knife edge thereof with said curves of the converging surfaces of the knife being extended in the same direction, to impart a corresponding curvature to a split formed in a shot by said knife.

HARRY H. PRECIOUS.

References Cited in the file of this patent
UNITED STATES PATENTS

| Number | Name | Date |
| --- | --- | --- |
| 753,456 | Weidinger | Mar. 1, 1904 |
| 838,920 | Varnedoe | Dec. 18, 1906 |
| 942,356 | Shelley | Dec. 7, 1909 |
| 1,344,046 | Lee | June 22, 1920 |
| 2,267,660 | McPhail | Dec. 23, 1941 |
| 2,571,819 | Boel et al. | Oct. 16, 1951 |